A
United States Patent [19]

Sekmakas et al.

[11] 4,022,737
[45] May 10, 1977

[54] AQUEOUS DISPERSIONS OF HYDROPHOBIC POLYMER PARTICLES USING SURFACE ACTIVE POLYMERS

[75] Inventors: Kazys Sekmakas, Chicago; Robert O. Yates, Arlington Heights, both of Ill.

[73] Assignee: DeSoto, Inc., Des Plaines, Ill.

[22] Filed: Aug. 20, 1971

[21] Appl. No.: 173,641

[52] U.S. Cl. .................. 260/29.4 UA; 260/29.6 F; 260/29.6 RB; 260/853; 260/856; 260/900
[51] Int. Cl.$^2$ ........................................ C08L 61/20
[58] Field of Search ............. 260/29.4 UA, 29.6 F, 260/29.6 RB, 29.6 XA, 856, 853, 900

[56] References Cited

UNITED STATES PATENTS

| | | | |
|---|---|---|---|
| 3,062,764 | 11/1962 | Osdal | 260/29.6 F |
| 3,169,120 | 2/1965 | Capron et al. | 260/29.6 F |
| 3,305,505 | 2/1967 | Ropp | 260/29.6 RB |
| 3,435,009 | 3/1969 | Sellet | 260/29.4 UA |
| 3,586,654 | 6/1971 | Lerman et al. | 260/29.6 F |
| 3,620,988 | 11/1971 | Cohen | 260/29.6 XA |
| 3,679,618 | 7/1972 | Lohr | 260/29.4 UA |

*Primary Examiner*—Lorenzo B. Hayes
*Attorney, Agent, or Firm*—Dressler, Goldsmith, Clement, Gordon & Shore, Ltd.

[57] ABSTRACT

Finely divided particles of normally solid addition polymer, such as particles of polyvinylidene fluoride having a particle size of from about 0.1 to about 60 microns in average diameter, and which are not stably dispersible in water in the absence of extraneous surface active agent, are stably dispersed by means of a carboxy-functional copolymer containing at least 30% by weight of copolymerized monomer providing terminal hydrocarbon groups having at least 8 carbon atoms, the copolymer being dissolved in the aqueous medium by salt formation with a base.

18 Claims, No Drawings

AQUEOUS DISPERSIONS OF HYDROPHOBIC POLYMER PARTICLES USING SURFACE ACTIVE POLYMERS

The present invention relates to aqueous dispersions of hydrophobic particles of normally solid addition polymer which have been stably dispersed in the aqueous medium by means of small amounts of certain surface active carboxy-functional copolymers which are present in solution by means of salt formation between a base and the carboxyl groups of the copolymer. The normally solid addition polymer is preferably a fluorocarbon and more preferably polyvinylidene fluoride. These polymer particles are quite small, e.g., from about 0.1 to about 60 microns in average diameter, preferably from 1–20 microns, and they are not stably dispersible in water in the absence of an extraneous surfactant, e.g., the particles require the addition of some agent before they can be stably dispersed.

As is presently known, hydrophobic polymer particles are difficult to handle in aqueous medium because they are not stably dispersible in the aqueous vehicle in the absence of some conventional surface active agent which may be present or added for this purpose. Since the surface active agent is highly sensitive to water, and since it remains associated with the hydrophobic polymer in a coating formed therefrom, it renders the final coating sensitive to water, thereby degrading the desired hydrophobic properties.

The purpose of this invention is to provide surface active polymers which can be dissolved in the aqueous phase of the dispersion of the hydrophobic particles of normally solid addition polymer via salt formation with carboxyl groups in the polymer, and which, in small amounts, will serve to stable disperse the hydrophobic polymer particles in the aqueous phase, thereby depositing films which possess superior resistance to moisture and chemical attack.

Also, strongly hydrophobic fluorine-containing addition polymers, and especially polyvinylidene fluoride, form extremely inert coatings which are highly durable. These are now applied from an organosol in which the polymer particles are dispersed in organic solvent. The solvents capable of compatibly dispersing polyvinylidene fluoride are expansive, noxious and provide only dilute resin organosols (25–30% solids); however, the coatings are so outstanding in durability as to justify the expense and difficulty of their organic solvent application. Nonetheless, aqueous application, if it could be carried out without unduly degrading the outstanding properties obtained from organic solvent application, would provide a significant advance in the art, and this is a further and important purpose of this development.

Referring first to the particles which are dispersed, the dispersed particles are normally solid addition polymers which are per se insoluble in water and not dispersible or wettable in water in the absence of a surfactant. The addition polymer has a linear carbon chain as the polymer backbone and it is substantially free of ordinary (conventional) surfactant so that, unless something is done, the unmodified solid polymer particles will not disperse in water. As previously indicated, the invention is especially directed to polyvinylidene fluoride polymer particles. However, other fluorocarbon polymers are contemplated, such as polyvinyl fluoride and polytetrafluoroethylene. Other hydrophobic addition polymers which may be employed are polyvinyl chloride, polyvinylidene chloride, polyethylene, polypropylene, and polymethyl methacrylate. Copolymers, and especially those containing less than 10% by weight of copolymeric component are also contemplated, e.g., a copolymer of 96% vinyl chloride with 4% of vinylidene chloride or 4% of ethylene. It is stressed that it is the physical characteristics of the polymer which dominate, e.g., any normally solid addition polymer (provides a linear carbon polymer backbone) and which is hydrophobic and in finely divided form (0.1 – 60 microns) can be stably dispersed in the aqueous medium by this invention. In connection with the selection of hydrophobic polymer particles, it is desired to minimize the colloidal, water sensitive material which is associated with the polymer particles which are dispersed. Thus, polyvinyl chloride in finely divided form is available by suspension polymerization and also by bulk polymerization, the latter being preferred.

The invention employs a surface active copolymer which is an addition copolymer of monoethylenic monomers which is soluble in aqueous alkaline medium by means of salt formation with carboxyl groups in the polymer. Having regard to the other components of the copolymer, there must be sufficient carboxyl groups to enable solubilization in water via salt formation with a base. Generally, if hydrophilic groups, such as hydroxy groups, are present, acid numbers as low as about 20 may be used, but preferably the acidity is higher, e.g., 25–120. The preferred acid value is 25–90.

The surface active polymer must also include at least 30% by weight, preferably at least 50% by weight, of monoethylenic monomer providing long chain terminal hydrocarbon side chains in the copolymer. By long chain is meant at least 8 carbon atoms in the terminal groups. Longer chains up to about 24 carbon atoms are available and may be used, the longer the chain, the less of the monoethylenic ester or ether providing the same is needed. Alkyl groups containing from 10–18 carbon atoms are particularly preferred.

To illustrate the need for long chain terminal groups, a typical system in this invention was made up to contain the same proportion of two different acrylic copolymers, each containing 10% methacrylic acid and 15% methyl methacrylate. When the balance of the copolymer was butyl acrylate, the system had poor dispersing properties, poor appearance (film was seedy and included undispersed particles and showed poor flow and leveling character) and the defoaming properties were bad. In contrast, replacing the butyl acrylate with stearyl methacrylate, all of the above qualities were good to very good, a remarkable change produced by using a less water soluble polymer.

Moreover, the proportion of surface active polymer which is used in this invention may be quite small, e.g., at least 0.05% based on the weight of hydrophobic polymer particles which are dispersed. Normally, one would employ from 0.1–5%, preferably from 0.2–3%, for this is all that is needed. Larger amounts, while permissible, and effective, would not normally be justified.

The copolymers are dissolved using a base to form a salt with the carboxyl groups of the copolymer. While any base may be used since so little salt formation is relied on, it is preferred to employ volatile nitrogenous bases such as amines or ammonia. The class of amines which may be used to solubilize carboxyl copolymers in aqueous medium is well known and is illustrated herein by triethanolamine. Other amines, such as ethyl amine, diethyl amine, triethyl amine, dimethyl ethanol amine, and diethanol amine are well known to be useful.

The pH of the aqueous bath is not critical, but broadly one may use a pH of from about 6 to about 11, preferably from 7–10.

Without intending to be bound by any theory, it would appear that the large proportion of long chain hydrocarbon terminal groups in the water-solubilized copolymer provides compatibility with the carbon chain of the solid linear hydrophobic polymer particles to enable stable water dispersion to take place.

In the present invention, it is convenient to prepare the surface active carboxyl-containing interpolymer by solution copolymerization in organic solvent solution. A water miscible organic solvent is used since this assists in the intended dissolving of the copolymer in the aqueous medium. The organic solvent can also serve to assist in the coalescing of the solid polymer particles, as will be explained.

It is also convenient to first dissolve the carboxyl copolymer in water to form an aqueous solution, the selected base being added either to the copolymer solution in organic solvent or to the water. The solid particles to be dispersed are then simply added to the water solution so-provided. To illustrate how little carboxyl copolymer is needed in this invention, preferred practice used 0.25% of surface active copolymer based on the weight of solid polymer which is dispersed.

The stable dispersion provided as above described may be used as such and without further modification. The solid polyvinylidene fluoride polymer particles will coalesce and form a film on baking at 450° F. for 60 seconds, especially when a small proportion of high boiling water miscible organic solvent is included in the aqueous composition. The use of such high boiling solvent represents normal practice, but these solvents and their use to aid the coalescence of particles deposited from aqueous medium is well known and is not a feature of this invention. Such high boiling water miscible solvents concentrate in the film as the water is vaporized therefrom during the customary baking operation and, when the water is finally depleted, the solvent assists particle coalescence making the film nonporous and helping to lower the baking temperature required. The solvents also help to minimize foaming when the dispersion is produced.

These solvents are normally used in an amount of from 1–50%, based on the weight of dispersed hydrophobic resin particles, preferably from 3–20% on the same basis. Such solvents are illustrated herein by 2-butoxy ethanol, but other appropriate solvents are well known.

Referring more particularly to the surface active carboxy-functional copolymer, the carboxyl groups can be provided by the copolymerization of monoethylenically unsaturated carboxylic acid such as acrylic acid, methacrylic acid, crotonic acid, itaconic acid, maleic acid, fumaric acid, or the like. Even acidic esters such as monobutyl maleate may be used. If the ester provides sufficient chain length, it can serve to provide both the required acidity and all or a portion of the desired monomer providing long chain terminal hydrocarbon groups in the copolymer. Examples of such long chain length acidic esters are monooctyl maleate and monooctyl fumarate. Even maleic anhydride can be used if it is hydrolyzed or half esterified with alcohol either during or subsequent to copolymerization.

If the acidity of the copolymer is excessive, it can be reduced by reaction of the copolymer with monoepoxide. In some instances, it is desired to minimize the copolymer acidity which is needed, or to maximize the proportion of long chain monomer. In either instance, monoepoxide reaction is helpful and it generates hydroxy functionality which yields preferred properties. Appropriate monoepoxides are ethylene oxide, propylene oxide, butylene oxide or the glycidyl ester of versatic acid.

On the other hand, and when hydroxyl functionality in the copolymer is desired, it can less effectively be supplied by having an hydroxyl monomer, such as hydroxy ethyl methacrylate or acrylate or hydroxy propyl methacrylate or acrylate or allyl methallyl alcohol present during the copolymerization.

It is also possible, when hydroxy monomers are incorporated by copolymerization, as above indicated, to omit the carboxy-functional monomer. In this instance, the hydroxy-functional addition copolymer is reacted with a polycarboxylic acid monoanhydride, such as phthalic acid, maleic acid, or more preferably trimellitic anhydride, to consume some or all of the hydroxy functionality and thereby generate carboxy functionality for salt formation.

The monomers providing the long chain terminal hydrocarbon groups are illustrated by ethers and esters of monoethylenic carboxylic acids and alcohols. The terminal group is necessarily remote from the single ethylenic group so that it will be in a terminal position in the polymer (as a side chain) and not part of the polymer backbone. The terminal group should be a hydrocarbon chain which may be either straight or branched, or a mixture thereof. The preferred materials are esters of an alkanol with a monoethylenically unsaturated carboxylic acid, several of which have been identified hereinbefore. These are illustrated by n-octyl acrylate, methacrylate or maleate or the corresponding ester with decyl, lauryl, or stearyl alcohol. Lauryl methacrylate and stearyl methacrylate are particularly preferred. Diesters such as bisododecyl maleate are also appropriate. Branched chain alcohols such as 2-ethylhexyl alcohol are quite useful for ester formation.

Other esters which may be used are formed by reaction of a vinyl alcohol or allyl or methallyl alcohol with a long chain acid such as decanoic acid or other fatty acid which may be saturated or unsaturated. Fatty acids such as oleic, linoleic, linolenic, linseed, sunflower, and the like are all useful. Some drying capacity in the fatty acid can be tolerated, but should be minimized.

Ethers of long chain alcohols, as noted above, with monoethylenic alcohols, as also noted above, can also be used, e.g., the ether of allyl alcohol with stearyl alcohol.

The balance of the copolymer can be constituted by any copolymerizable ethylenic material which does not destroy the solubility of the copolymer. These are illustrated by ethyl acrylate, butyl acrylate, ethyl methacrylate, bisisobutyl maleate, isobutyl, methacrylate, styrene, vinyl toluene, methyl methacrylate, acrylonitrile, and the like. While monoethylenic monomers are preferred, polyesters having a small proportion of unsaturation and which are known to be polymerizable with vinyl monomers without destroying solvent solubility may be used in small amount.

It is desired to point out that the presence of hydroxy functionality in the surface active copolymer leads to the production of the most outstanding dispersions. Accordingly, the preferred copolymers have an hydroxy value of at least 10, preferably at least 20. An hydroxy value up to about 100 is quite useful, though higher hydroxy values are still useful, though less preferred. Also, and when aminoplast resins are present in the dispersions, the presence of hydroxy groups in the surface active copolymer helps the cure and assures lack of water sensitivity in the cured film. In contrast, conventional surfactants will remain permanently water sensitive which degrades the weather and chemical resistance of the coatings which are formed. Also, the dispersion properties are poor, causing foaming tendencies, blistering, cratering, and pigment flocculation. Even where the surface active polymer contains no hydroxy groups, the carboxyl functionality which is introduced creates less sensitivity to water than is normally found with conventional surfactants. An aminoplast resin with an appropriate bake can further reduce the carboxyl functionality.

The provision of pigmented systems is a feature of this invention. One effective way to do this is to first associate the pigment with an acidic resin in solvent solution and then disperse the resin with the associated pigment in water to form a concentrated aqueous paste which is mixed into the aqueous phase of the dispersions. It is particularly preferred to disperse the pigment in a water soluble resin to form a paste which can be added to the dispersion. The water soluble resin, while not essential, is desirable because it helps to fuse the hydrophobic resin particles at lower temperature to plasticize the film which is formed, and to form pigmented films of higher gloss.

Another way to pigment the system is to grind the pigment into an aqueous emulsion paint in the normal manner used to form pigmented latex paints. The emulsion containing the dispersed pigment is then mixed into the dispersions of this invention.

The water soluble resins which may be used to introduce pigmentation, for plasticizing action, or to lower baking temperature, may be of diverse type, but it is preferred to employ carboxyl-functional resins having an acid number of from about 10 to about 300, preferably from 20-100, and which are solubilized by salt formation with a base, preferably a volatile nitrogenous base. Hydroxy functionality is desirably present in the same manner as explained for the surface active copolymers, but here the hydroxy functionality importantly serves to encourage a thermosetting cure, particularly with aminoplast resins. Polyesters, polyethers, polyurethanes, acrylic copolymers and even maleated oils are all well known to be solubilized in aqueous medium with the aid of a base and can be used in this invention. Broadly, the water soluble resin can be used in a weight ratio of 95/5 to 5/95 with respect to the dispersed polymer particles. However, preferred weight ratios of soluble resin to dispersed polymer particles are from 90/10 to 30/70, most preferably from 80/20 to 50/50. As will be evident from the substantial proportions used, these resins do not possess any significant surface activity, and, if they did, one would not normally select them to be used in such large amount.

All sorts of emulsion polymers can also be added on an optional basis, particularly where the emulsified resin has a $T_g$ (glass transition temperature) above 0° C., since this assists in the formation of a continuous nonporous film at low baking temperature. Ethylene-vinyl acetate copolymers in aqueous emulsion will illustrate the materials which can be used. Such emulsions are further illustrated by the one disclosed in Example 2 of U.S. Pat. No. 3,356,653.

Aminoplast resins referred to hereinbefore constitute a well known class of materials and these are desirably water soluble in this invention, e.g., dimethylol urea, or hexamethoxy methyl melamine. Non-water soluble, but water dispersible, aminoplasts are also available and can be used, e.g., partially alkylated derivatives of mexamethoxy methyl melamine such as a derivative in which three of the six methoxy groups are replaced by ethoxy groups. Similarly, water dispersible benzoguanamine-formaldehyde condensates are useful as are water insoluble carboxyl functional derivatives of aminoplasts which can be dispersed with the aid of a base. All of these aminoplast resins are known per se.

The aminoplast resin is generally used in an amount of from 5-50%, preferably from 10-35%, based on the weight of water soluble resin.

The dispersions of this invention are primarily adapted to deposit adherent coatings on metal surfaces, such as iron, tinplate, or primed surfaces. However, paper coatings are also contemplated and free films can also be made. When applied to metal for coating purposes, the dispersions may be brushed, roller coated, or sprayed onto the metal surface and then baked, usually at temperatures of from 350° F – 550° F. for periods of from 30 seconds to 1 hour. On paper, the dispersions are hot calendered to produce a gloss finish. The free films are extremely inert and can be used for packaging or lamination under heat and pressure.

The term "stably dispersed" as used herein is not intended to denote permanent stability. In the absence of extraneous surface active agent, the polymer particles settle out providing distinct phases in less than an hour. The dispersions of this invention remain uniform and single phase for at least about one week.

It will be appreciated that diverse agents can be added to the aqueous suspensions which are under consideration to control viscosity or flow, or to minimize foaming during the preparation of the dispersions. Also, waxes may be added to the dispersions to provide lubricity for fabrication of the baked films which are produced. Still further, dyes, and agents to assist in resisting thermal or ultraviolet decomposition, or other similar materials may be included.

The invention is illustrated in the examples which follow, in which all parts are by weight unless otherwise indicated.

EXAMPLE 1

Preparation of Special Surfactant Solution for Polyvinylidene Fluoride Dispersion in Water

| Charge Composition (Parts by Weight) | | |
|---|---|---|
| 665 | 2-Ethoxy Ethanol- Charge to reactor and heat to 130° C. | |
| 750 | Stearyl Methacrylate | Premix and add to reactor over a 2 hour period while maintaining temperature at 130–135° C. Hold for 1 hour. |
| 100 | Methacrylic Acid | |
| 150 | Styrene | |
| 10 | Di-tertiary Butyl Peroxide | |
| 3 | Tertiary Butyl Perbenzoate - Add - hold 1 hour. | |
| 3 | Tertiary Butyl Perbenzoate - Add - hold 1 hour. | |

-continued

| The final characteristics of the solution are: | |
|---|---|
| Solids | 58.2% |
| Viscosity | Z$_2$+ (Gardner Holdt) |
| Acid Value | 68.6 |

EXAMPLE 2

Preparation of Surfactant Solution in Alkaline Water

| | |
|---|---|
| 20 parts | Surfactant of Example 1 |
| 6 parts | Triethanolamine |
| 40 parts | 2-Butoxy Ethanol |
| 40 parts | Deionized Water |

EXAMPLE 3

Preparation of Polyvinylidene Fluoride Dispersion in Water

| Part A (Parts by Weight) | |
|---|---|
| 20 | Surfactant Solution of Example 2 |
| 800 | Polyvinylidene Fluoride Powder[1] (Average particle size 20 microns) |
| 1150 | Deionized Water |
| 50 | 2-butoxy Ethanol |
| 5 | Surfactant Solution of Example 2 |
| 2025 | parts |

[1] The commercial product Kynar 500 (Pennwalt Corporation) may be used if desired.

Sand grind the above ingredients to obtain uniform dispersion in water. Then add 5 parts of surfactant solution after the grinding is completed for defoaming purposes.

| Part B (Parts by Weight) | |
|---|---|
| 1155 | Thermosetting Water Soluble Acrylic Resin Modified with Hexamethoxy Methyl Melamine (see Example 4) |
| 685 | Titanium Dioxide Pigment |
| 8 | Surfactant Solution of Example 2 |
| 30 | Propylene Glycol |
| 1878 | parts |

Disperse the titanium dioxide pigment in the acrylic solution with high speed agitation.

| Part C- | Preparation of final coating having 60% polyvinylidene fluoride and 40% acrylic resin solids |
|---|---|
| 2025 Part | A - Mix Part A and Part B at low speed agitation |
| 1878 Part | B - and adjust with 160 parts of water to 55% solids. |

Final characteristics of coating solution:
Titanium pigment ratio to resin solids: .65 / 1.00

Ratio of polyvinylidene fluoride solids to thermosetting acrylic modifier:
60% Polyvinylidene Fluoride
40% Acrylic Modifier
Final total solids: 55%

Typical properties of films deposited from the above solution and baked at 425° F. for 90 seconds to cure the same are as follows:

| | |
|---|---|
| O T bend | Pass |
| Impact (direct) | 80 in.-lbs. |
| Impact (reverse) | 70 in.-lbs. |
| Pencil hardness | H |
| Solvent Resistance | Pass 100 methyl ethyl ketone rubs |
| Salt Spray Resistance - | Excellent (1000 hours with 5% salt solution - no rust) |

Substrate - 019 inch gauge Bonderized 721 treated aluminum panels

EXAMPLE 4

Preparation of Acrylic Resin

| Procedure of Preparation (Parts by Weight) | |
|---|---|
| 450 | 2-Butoxy ethanol - charge to reactor and heat to 135° C. |
| 985 Styrene | Premix monomers and mercaptan and add to reactor over a 3 hour period while maintaining the temperature at 130–135° C. |
| 340 Acrylic Acid | |
| 1075 Butyl Acrylate | |
| 60 Tertiary Dodecyl mercaptan | |
| 150 | 2-Butoxy Ethanol |
| 50 | Tertiary Butyl Perbenzoate |

Add the above catalyst solution simultaneously to reactor from a separator container over a 3 hour period. When addition is completed, hold for one hour.

| | |
|---|---|
| 5 | Tertiary Butyl Perbenzoate - add, hold 1 hour. |
| 5 | Tertiary Butyl Perbenzoate - add, hold 1 hour. |
| 30 | Diisopropanol Amine |
| 30 | 2-Butoxy Ethanol } Cool to 120° C. and add. |
| 50 | Propylene Oxide - Add over 20 minute period and hold for an acid value of 82–83. |
| 650 | Isopropanol - Cool and add. |

The final characteristics of the resin are:
Solids 66.9%
Acid Value 83.0

The hexamethoxy methyl malamine is dissolved in the above solution to provide a weight ratio of acrylic copolymer to melamine solids of 80:20.

EXAMPLE 5

Preparation of Polyvinylidene Fluoride Powder Dispersion in Water Utilizing Water Soluble Acrylic Surfactant Disperse the following (parts by weight) using high speed agitation:

| | |
|---|---|
| 750 | Polyvinylidene Fluoride Powder of Example 3 |
| 1428 | Deionized Water |
| 25 | 2-Butoxy Ethanol |
| 15 | Surfactant of Example 1 |

Add 47 parts 2-butoxy ethanol for viscosity adjustment and use sand mill to grind to obtain final dispersion. The mixture so-provided passes through the sand mill without excessive foaming and a stable, satisfactory polymer dispersion in water is obtained which exhibits good storage stability at 33% solids dispersion.

Water Soluble Surface Active Polymers

The following table lists the hydroxy and acid functional surface active polymers which are used for polymeric powder material dispersions. The surfactants have functional groups which can be cross-linked upon baking with heat reactive aminoplast or epoxy curing agents.

|  | A | B | C | D | E | F | G |
|---|---|---|---|---|---|---|---|
| Methacrylic Acid | 10% | 10% | 10% | 10% | 5% |  | 5% |
| Stearyl Methacrylate | 75% |  | 75% | 75% | 75% | 75% | 75% |
| Styrene | 15% | 15% |  |  | 15% | 15% |  |
| Hydroxy Ethyl Acrylate |  |  |  |  | 5% |  | 5% |
| Methyl Methacrylate |  |  | 15% |  |  |  | 15% |
| Lauryl Methacrylate |  | 75% |  |  |  |  |  |
| Isobutyl Acrylate |  |  |  | 15% |  |  |  |
| Acrylic Acid |  |  |  |  |  | 10% |  |
| Resin Solids Content | 58.2% | 55.9% | 57.3% | 58.2% | 58.6% | 61.3% | 57% |
| Viscosity (Gardner Holdt) | $Z_2+$ | $Z_2+$ | $Z_3-Z_4$ | Y | $Z-Z_1$ | $Z_3-Z_4$ | $Z_1-Z_2$ |
| Color (Gardner) | 1 | 1 | 1 | 1 | 1 | 1 | 1 |
| Acid Value (NonVolatiles) | 68.6 | 71.7 | 60.7 | 67.5 | 32.8 | 64.1 | 34.4 |
| Dispersing Properties | V.G. | Fair | V.G. | V.G. | Ex. | Good | Ex. |
| Appearance | V.G. | Fair | V.G. | V.G. | Ex. | Fair | Ex. |
| Foaming Tendency | Good | Fair-Good | Good | Good | Good | Good | Good |

V.G. = Very Good, Ex. = Excellent

In contrast to the successful results tabulated above, a copolymer of 10% methacrylic acid, 15% methylmethacrylate and 75% of butyl acrylate produced a resin solids content of 59.9%, a Gardner-Holdt viscosity of T-U, a Gardner color of 1, and an acid value of 60.5. While these copolymer characteristics are in line with the tabulated polymers, the dispersions produced using the same are completely different since the dispersing properties and the appearance are both poor and the foaming tendency was bad.

The invention is defined in the claims which follow. We claim:

1. An aqueous dispersion comprising particles of a normally solid polyvinylidene fluoride hydrophobic addition polymer having a particle size of from about 0.1 to about 60 microns in average diameter and not stably dispersible in water in the absence of extraneous surface active agent, said particles being stably dispersed in an aqueous medium comprising water having dissolved therein, as the essential agent dispersing said particles, at least 0.05%, based on the weight of hydrophobic polymer particles, of a carboxy functional surface active copolymer having an acid value of at least about 20 and containing at least 30% by weight of copolymerized monoethylenic monomer providing terminal hydrocarbon side chains having at least 8 carbon atoms in the copolymer, said copolymer being dissolved in the aqueous medium by means of salt formation with a base.

2. An aqueous dispersion as recited in claim 1 in which said surface active copolymer has an acid value of 25-120.

3. An aqueous dispersion as recited in claim 1 in which said surface active copolymer has an hydroxyl number of at least 10.

4. An aqueous dispersion as recited in claim 3 in which said surface active copolymer has an hydroxyl number up to about 100.

5. An aqueous dispersion as recited in claim 1 in which said surface active copolymer contains at least 50% by weight of monoethylenic monomer providing long chain terminal hydrocarbon side chains in the copolymer.

6. An aqueous dispersion as recited in claim 1 in which said surface active copolymer is dissolved by salt formation with a nitrogenous base and is used in an amount of from 0.1–5% on said weight basis.

7. An aqueous dispersion in claim 6 in which said surface active copolymer is used in an amount of from 0.2–3% on the said weight basis.

8. An aqueous dispersion as recited in claim 1 in which said surface active copolymer contains at least 50% by weight of esters of a saturated alcohol containing from 10–18 carbon atoms with a monoethylenic carboxylic acid.

9. An aqueous dispersion as recited in claim 1 in which said polymer particles have an average diameter of 1–20 microns.

10. An aqueous dispersion as recited in claim 1 in which said dispersion further includes from 1–50%, based on the weight of hydrophobic polymer particles, of high boiling water miscible organic solvent which concentrates as the water is evaporated to aid the coalescence of said hydrophobic polymer particles.

11. An aqueous dispersion as recited in claim 10 in which said high boiling solvent is 2-butoxy ethanol used in an amount of from 3–20%, based on the weight of hydrophobic polymer particles.

12. An aqueous dispersion as recited in claim 1 in which said dispersion is pigmented by means of pigment associated with resin which is dissolved in the aqueous medium.

13. An aqueous dispersion as recited in claim 1 in which said dispersion is pigmented by incorporating therein a pigmented aqueous latex emulsion.

14. An aqueous dispersion as recited in claim 1 in which said dispersion had dissolved in the aqueous phase with the aid of a base, a carboxyl functional resin having an acid number of from about 10 to about 300.

15. An aqueous dispersion as recited in claim 14 in which said dispersion further includes aminoplast resin.

16. An aqueous dispersion as recited in claim 15 in which said dissolved carboxyl functional resin also contains hydroxy functionality.

17. An aqueous dispersion as recited in claim 14 in which said carboxyl functional resin is an acrylic copolymer.

18. An aqueous dispersion comprising particles of a normally solid polyvinylidene fluoride hydrophobic fluorocarbon addition polymer having a particle size of from 1–20 microns in average diameter and not stably dispersible in water in the absence of extraneous surface active agent, said particles being stably dispersed in an aqueous medium comprising water having dissolved therein, as the essential agent dispersing said particles, from 0.1–5%, based on the weight of hydrophobic polymer particles, of a carboxy functional surface active copolymer having an acid value of 25–120 and containing at least 50% by weight of copolymerized esters of a saturated alcohol containing from 10–18 carbon atoms with a monoethylenic carboxylic acid, said copolymer being dissolved in the aqueous medium by means of salt formation with a base.

* * * * *